US012671976B2

(12) United States Patent
Wu et al.

(10) Patent No.: US 12,671,976 B2
(45) Date of Patent: Jun. 30, 2026

(54) ANTENNA SHIFTING METHOD, ELECTRONIC DEVICE AND STORAGE MEDIUM

(71) Applicant: Beijing Xiaomi Mobile Software Co., Ltd., Beijing (CN)

(72) Inventors: Xinnan Wu, Beijing (CN); Jiaxing Gong, Beijing (CN); Deqian Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 319 days.

(21) Appl. No.: 18/345,334

(22) Filed: Jun. 30, 2023

(65) Prior Publication Data

US 2024/0323672 A1    Sep. 26, 2024

(30) Foreign Application Priority Data

Mar. 24, 2023    (CN) .......................... 202310309250.2

(51) Int. Cl.
*H04W 8/18*        (2009.01)
*H04B 1/18*        (2006.01)

(52) U.S. Cl.
CPC .............. *H04W 8/186* (2013.01); *H04B 1/18* (2013.01)

(58) Field of Classification Search
CPC .. H04B 1/3816; H04B 7/0608; H04B 17/318; H04B 7/0626; H04B 1/0064; H04B 1/48;
H04B 17/309; H04B 7/0695; H04B 7/06952; H04B 7/0871; H04B 1/12; H04B 1/18; H04B 1/3818; H04B 1/40; H04B 17/327; H04B 17/328; H04B 7/0602; H04B 7/0802; H04B 7/18519; H04W 8/183; H04W 88/06
USPC ........................................................ 455/552.1
See application file for complete search history.

(56) References Cited

U.S. PATENT DOCUMENTS

| | | | | |
|---|---|---|---|---|
| 2012/0140709 | A1* | 6/2012 | Hou .................. | H04W 56/0015 370/328 |
| 2020/0128481 | A1* | 4/2020 | Kim ...................... | H04W 48/14 |
| 2023/0014227 | A1 | 1/2023 | Kumar | |

FOREIGN PATENT DOCUMENTS

| | | |
|---|---|---|
| CN | 110086481 A | 8/2019 |
| CN | 114828263 A | 7/2022 |

\* cited by examiner

*Primary Examiner* — Ajibola A Akinyemi
(74) *Attorney, Agent, or Firm* — McCoy Russell LLP

(57)        ABSTRACT

An antenna shifting method includes: obtaining a working status of SIM cards in a first circuit path and a second circuit path, where the working status includes a status that only the SIM card in the first circuit path is working; and shifting, in response to determining that the working status is the status that only the SIM card in the first circuit path is working, at least one antenna of the second circuit path to the first circuit path.

15 Claims, 4 Drawing Sheets

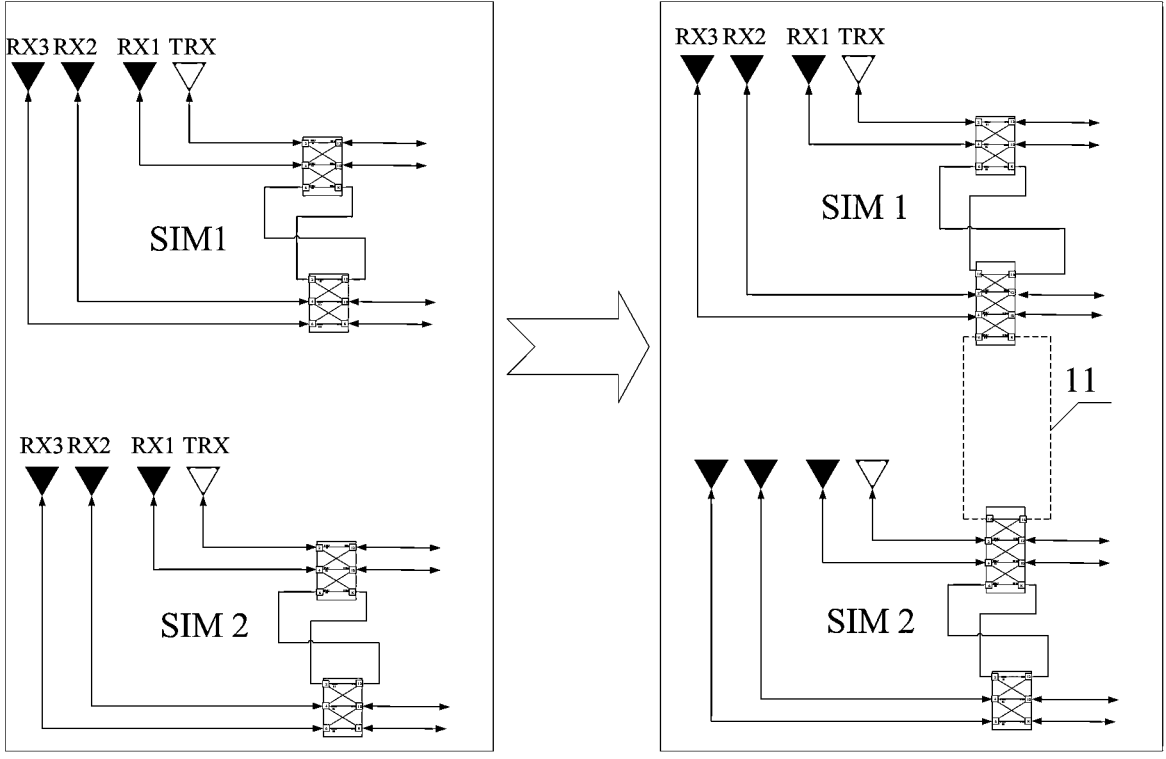

Fig. 1

| Obtain a working status of SIM cards in a first circuit path and a second circuit path, the working status including a status that only the SIM card in the first circuit path is working | 21 |
|---|---|

| Shift, in response to determining that the working status is the status that only the SIM card in the first circuit path is working, at least one antenna of the second circuit path to the first circuit path | 22 |
|---|---|

Fig. 2

Obtain reference signal received power of each antenna in a second circuit path   ~61
Select at least one antenna corresponding to the reference signal received power according to a sequence from large to small   ~62
Shift the at least one antenna to a first circuit path   ~63
Fig. 6
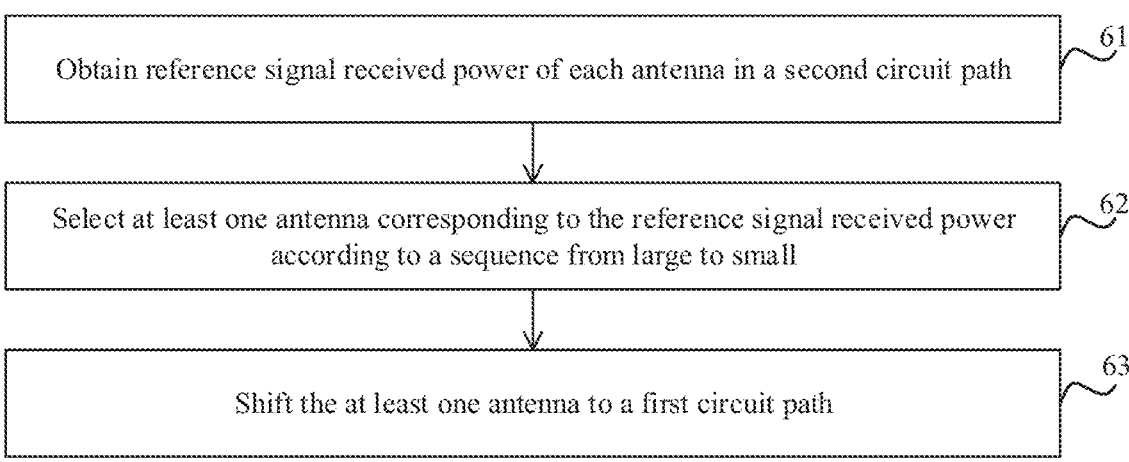
Fig. 7
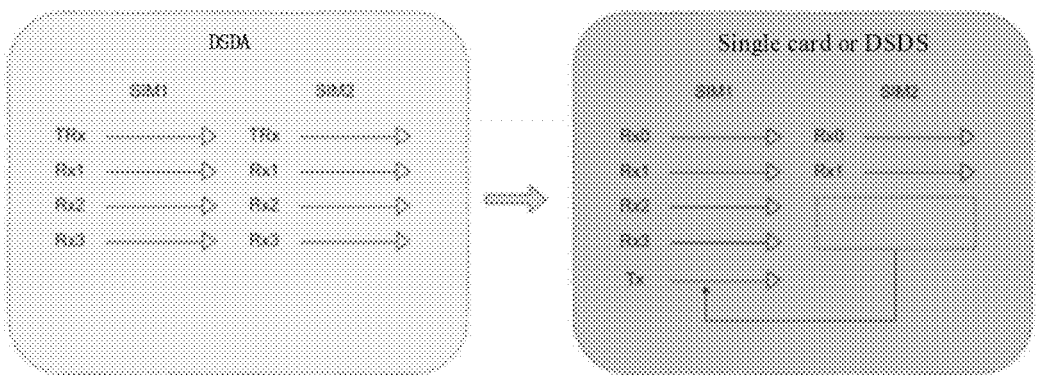
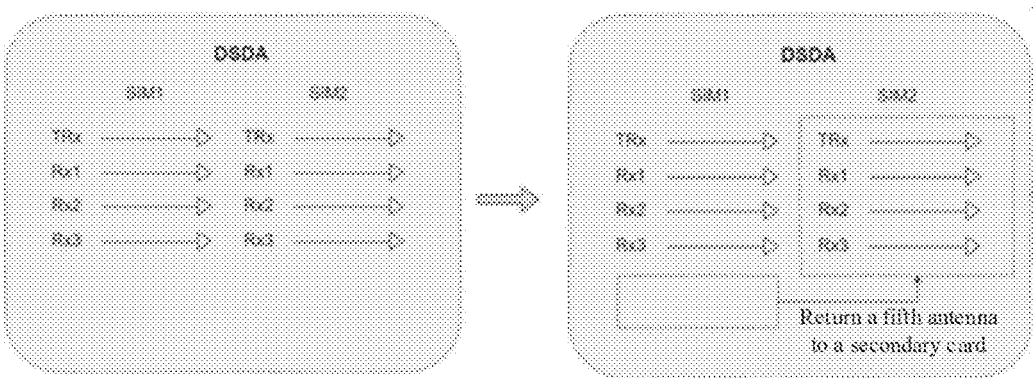
Fig. 8

ANTENNA SHIFTING METHOD, ELECTRONIC DEVICE AND STORAGE MEDIUM

CROSS REFERENCE TO RELATED APPLICATION

The present application claims priority to Chinese Patent Application No. 202310309250.2 filed on Mar. 24, 2023. The entire contents of the above-listed application is hereby incorporated by reference for all purposes.

BACKGROUND

An electronic device today is usually equipped with a plurality of antennas; a 4G device usually has 4-6 antennas, and a 5G device usually has more than 10 antennas. However, when a user uses the electronic device, a holding posture will obscure the antennas, resulting in a large attenuation of a transmitted signal of a transmitting antenna.

SUMMARY

According to a first aspect of an example of the disclosure, an antenna shifting method is provided and performed by an electronic device. The electronic device includes a first circuit path and a second circuit path; a first SIM card slot is arranged in the first circuit path and a second SIM card slot is arranged in the second circuit path; the first SIM card slot and the second SIM card slot are configured to accommodate a SIM card respectively; and the method includes:

obtaining a working status of the SIM cards in the first circuit path and the second circuit path, where the working status includes a status that only the SIM card in the first circuit path is working; and shifting, in response to determining that the working status is the status that only the SIM card in the first circuit path is working, at least one antenna of the second circuit path to the first circuit path.

According to a second aspect of an example of the disclosure, an electronic device is provided. The electronic device includes a first circuit path and a second circuit path; a first SIM card slot is arranged in the first circuit path and a second SIM card slot is arranged in the second circuit path; the first SIM card slot and the second SIM card slot are configured to accommodate a SIM card respectively; and the electronic device further includes a shifting module, a memory and a processor.

The shifting module is electrically connected with the first circuit path, the second circuit path and the processor respectively; and the processor is electrically connected with the memory.

The memory is configured to store a computer program executable by the processor. The processor is configured to:

obtain a working status of the SIM cards in the first circuit path and the second circuit path; and shift, in response to determining that the working status is the status that only the SIM card in the first circuit path is working, at least one antenna of the second circuit path to the first circuit path.

According to a third aspect of an example of the disclosure, a non-transitory computer-readable storage medium is provided, on which computer program are stored that, when executed by a processor, cause the processor to:

obtain a working status of the SIM cards in the first circuit path and the second circuit path; and shift, in response to determining that the working status is the status that only the SIM card in the first circuit path is working, at least one antenna of the second circuit path to the first circuit path.

BRIEF DESCRIPTION OF THE DRAWINGS

The accompanying drawings, which are incorporated in and constitute a part of this specification, illustrate examples consistent with the disclosure and together with the specification serve to explain the principles of the disclosure.

FIG. 1 is a schematic diagram of two ID cards of an electronic device illustrated according to an example; and the diagram on the left represents a schematic diagram of two ID cards illustrated in the related art, and the diagram on the right represents a schematic diagram of two ID cards in the example.

FIG. 2 is a flow chart of an antenna shifting method illustrated according to an example.

FIG. 6 is a flow chart of antenna shifting illustrated according to an example.

FIG. 7 is a schematic diagram of a first circuit path "borrowing" one antenna from a second circuit path illustrated according to an example.

FIG. 8 is a schematic diagram of a first circuit path "returning" one antenna to a second circuit path illustrated according to an example.

DETAILED DESCRIPTION

Figure 3:
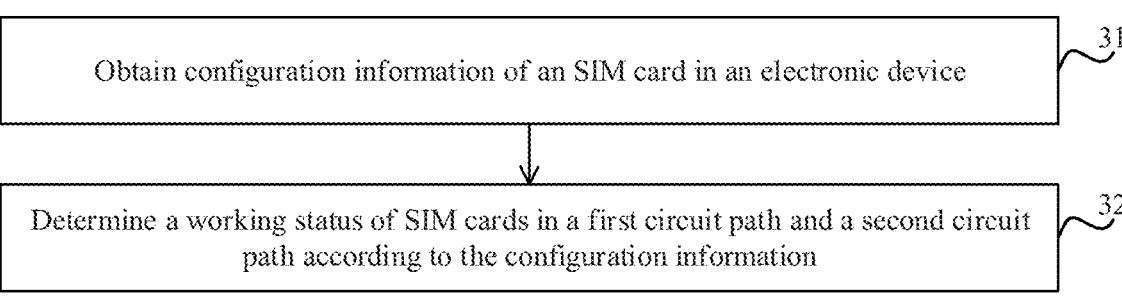
FIG. 3 is a flow chart of obtaining a working status of two ID cards illustrated according to an example.

Examples will be described in detail here, instances of which are represented in the accompanying drawings. When the following description refers to the accompanying drawings, the same numbers in different drawings represent the same or similar elements unless otherwise indicated. The examples described for example do not represent all examples consistent with the disclosure. On the contrary, they are merely instances of an apparatus consistent with some aspects of the disclosure as detailed in the appended claims. It should be noted that without conflict, the following examples and the features in the examples may be combined with each other.

The disclosure relates to the technical field of antenna control, in particular to an antenna shifting method and apparatus, an electronic device and a storage medium.

An antenna is an apparatus for radio wave transmission or reception, and its main function is to complete radiation and reception of electromagnetic waves through mutual conversion of an electric field and a magnetic field under the basic principle of an electromagnetic field. That is, circuit signal energy output by a transmitter is converted into electromagnetic waves to be radiated out, or a spatial electromagnetic wave signal is converted into circuit signal energy to be sent to a receiver.

In related art, a diversity reception technology is used to resist fading of a wireless signal due to different environmental factors in a process of spatial transmission. That is, a receiving end merges and processes a plurality of received independent (carrying the same information) fading characteristic signals to reduce signal level fluctuations.

In order to solve the above technical problem, examples of the disclosure provide an antenna shifting method and apparatus, an electronic device and a storage medium. The method and apparatus may be performed by the electronic device. The electronic device includes a first circuit path and a second circuit path; a first subscriber identity module (SIM) card slot is arranged in the first circuit path and a second SIM card slot is arranged in the second circuit path; and the first SIM card slot and the second SIM card slot are configured to accommodate a SIM card respectively.

It should be noted that the first circuit path includes N antennas, the second circuit path includes N antennas, and in the related art, the antennas of different circuit paths may merely be used by the corresponding circuit paths themselves, so the first circuit path and the second circuit path work independently, as shown in the diagram on the left in FIG. 1. A value range of N is 2-10. In the example of the disclosure, considering that in the two circuit paths, there may be one circuit path where the SIM card is not working or where there is no SIM card (i.e. the subsequent second circuit path), at the moment, the circuit path does not have the need to use the antennas, the antennas of the circuit path may be "borrowed" to the first circuit path at the moment, for this purpose, the electronic device further includes a processor and a shifting module, and the shifting module may be electrically connected to the first circuit path, the second circuit path and the processor respectively. A connection relationship of the shifting module is as shown in the diagram on the right in FIG. 1.

The shifting module may include a single-pole double-split switch, a double-pole double-split switch, a MOS switch tube, etc., and in the case that shifting the circuit paths can be realized, the corresponding solution falls within the scope of protection of the disclosure. The shifting module is electrically connected to the processor, and may receive a control instruction sent by the processor and adjust an antenna circuit path in response to the above control instruction. For example, the antenna may work in a circuit path of an original SIM card, or be shifted to a circuit path of other SIM cards.

In order to realize the antenna shifting operation between the first circuit path and the second circuit path, an example of the disclosure further provides an antenna shifting method. FIG. 2 is a flow chart of an antenna shifting method illustrated according to an example, and the method may be performed by the electronic device shown in FIG. 1. Referring to FIG. 2, the antenna shifting method includes step 21 to step 22.

In step 21, a working status of SIM cards in the first circuit path and the second circuit path is obtained; and the working status includes a status of shifting to that only the SIM card in the first circuit path is working.

In this step, a processor of the electronic device may obtain the working status of the SIM cards in the first circuit path and the second circuit path.

The abovementioned working status includes a status that only the SIM card in the first circuit path is working, for example, single standby (SS) or dual SIM dual standby (DSDS), and shifting to dual SIM dual standby. The abovementioned single standby (SS) refers to that one ID card is in a standby status and may receive a call. Dual SIM dual standby (DSDS) refers to that two ID cards are in a standby status and when the SIM card in the first circuit path is in a call, the SIM card in the second circuit path is not available for a call.

It should be noted that, for the convenience of the description of the solution, the first circuit path in the example refers to a circuit path corresponding to a first SIM card slot, which may be a circuit path corresponding to the SIM card in a call in a DSDS status or a circuit path with the SIM card in an SS status. The second circuit path refers to the other circuit path besides the first circuit path.

In an example, referring to FIG. 3, the step that the processor may obtain the working status of the SIM cards in the first circuit path and the second circuit path includes step 31 and step 32.

In step 31, configuration information of the SIM cards in the electronic device is obtained.

In this step, the configuration information of the SIM cards may be stored in a designated location (for example, a local memory and a buffering memory) in the electronic device. For example, a default (call) card is the first SIM card, and a data card is the second SIM card. It may be understood that the above configuration information may be configured by a user in a configuration interface and be stored and obtained.

In this step, the processor may configure a location from a designated location sequence from the designated location, i.e., the processor may obtain the configuration information of the SIM cards in the first circuit path and the second circuit path in the electronic device.

In step 32, the working status of the SIM cards in the first circuit path and the second circuit path is determined according to the configuration information.

In this step, the processor may determine the working status of the two SIM cards according to the abovementioned configuration information. For example, the configuration information includes that the first SIM card is the default card and the second SIM card is the data card, and it may be determined that the working status of the two SIM cards is a DSDS status. For another example, the configuration information includes that the first SIM card is the default card and the second SIM card does not exist (or has been turned off), and it may be determined that the working status of the two SIM cards is an SS status. For another example, the configuration information includes that the first SIM card is the default card and the second SIM card is a parallel default card, and it may be determined that the working status of the two SIM cards is DSDS status or a dual SIM dual active status. In an example, the working status of the two SIM cards in the configuration information is a status that only the SIM card in the first circuit path is working, i.e., a status that the SIM card in the first circuit path is working and the SIM card in the second circuit path is not working or no SIM card exists in the second circuit path.

In this way, in the example, the working status of the SIM cards may be determined through the configuration information, which may improve an efficiency of obtaining the working status.

Figure 4:
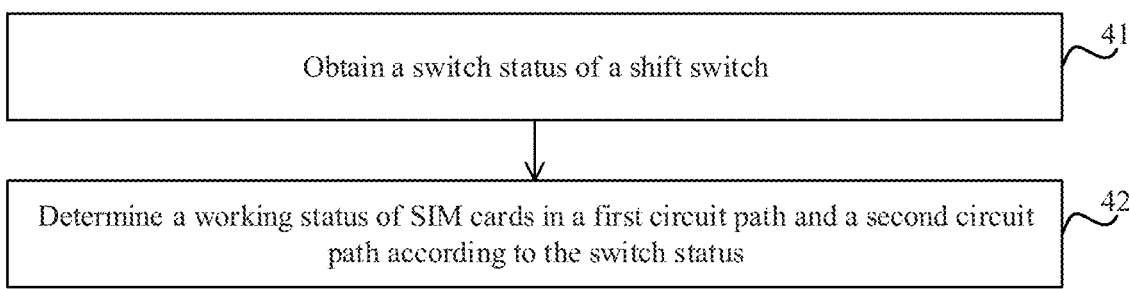
FIG. 4 is another flow chart of obtaining a working status of two ID cards illustrated according to an example.

In an example, referring to FIG. 4, the step that the processor may obtain the working status of the SIM cards in the first circuit path and the second circuit path includes step 41 and step 42.

In step 41, a switch status of a shift switch is obtained.

In this step, considering that the shift switch in the shifting module is configured to shift an antenna circuit path where an antenna is located, the working status of the SIM cards may be determined according to the switch status of the shift switch. Based on this, the processor may obtain the switch status of the shift switch. For example, the processor may obtain the switch status of shift switches through communication with a modem of an antenna module in the electronic device.

In step 42, the working status of the SIM cards in the first circuit path and the second circuit path is determined according to the switch status.

In this step, the processor may obtain the working status of the SIM cards according to a correspondence relation between the switch status and the working status.

In this step, the processor may determine the working status through communication with the modem without adding corresponding software or hardware, which may improve the efficiency of obtaining the working status.

Figure 5:
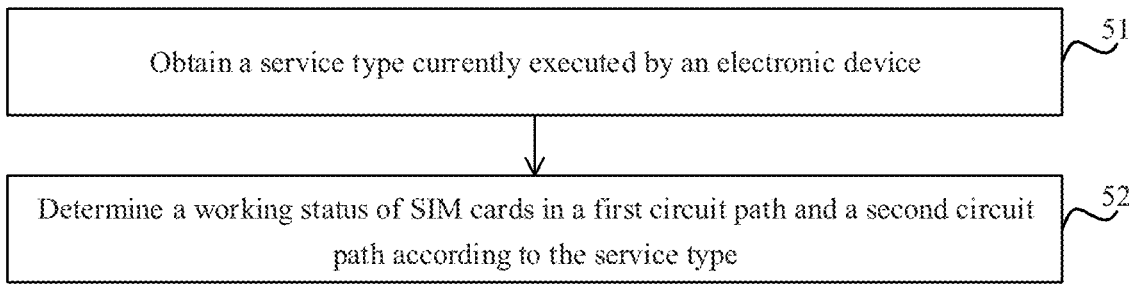
FIG. 5 is yet another flow chart of obtaining a working status of two ID cards illustrated according to an example.

In an example, referring to FIG. 5, the step that the processor may obtain the working status of the SIM cards in the first circuit path and the second circuit path includes step 51 and step 52.

In step 51, a service type currently executed by the electronic device is obtained.

In this step, the electronic device may execute all kinds of service in a working process. Service may be divided into data service and non-data service. For example, a call service may be classified as a non-data service type, and an Internet surfing service may be classified as a data service type.

In step 52, the working status of the SIM cards in the first circuit path and the second circuit path is determined according to the service type.

In this step, the processor may determine the working status of the SIM cards in the first circuit path and the second circuit path according to the abovementioned service type and a correspondence relation between the service type and the working status.

In this example, the processor may determine the working status through the service type, which may improve the efficiency of obtaining the working status.

In step 22, when the working status is shifted to a DSDS status, at least one antenna of the circuit path of a secondary card in the two SIM cards is shifted to the first circuit path.

In this step, when it is determined that the working status is shifted to a status that only one SIM card is working, the processor may shift at least one antenna of the second circuit path to the first circuit path.

Considering that the first circuit path includes its own antennas and the at least one antenna "borrowed" from the second circuit path, the plurality of antennas of the first circuit path may be divided into a transmitting antenna (TX) and receiving antennas (RXs) at the moment. Referring to FIG. 6, the step that the processor may shift the at least one antenna of the second circuit path to the first circuit path includes step 61 to step 63.

In step 61, reference signal received power of each antenna in the second circuit path is obtained.

In this step, the processor may obtain the reference signal received power (RSRP) of each antenna in the second circuit path.

In step 62, at least one antenna corresponding to the reference signal received power is selected according to a sequence from high to low.

In this step, the processor may rank the reference signal received power. Then, the processor may select at least one reference signal received power in the reference signal received power according to a sequence from high to low. For example, when one is selected, the processor may select an antenna corresponding to the highest reference signal received power; and when two are selected, the processor may select the antenna corresponding to the highest reference signal received power and an antenna corresponding to the second highest reference signal received power. Or, in the sequence from high to low, the processor may sequentially select the antennas corresponding to the highest, second highest, the third and the fourth reference signal received power, and then select at least one antenna.

In step 63, the at least one antenna is shifted to the first circuit path.

In this step, the processor may shift the abovementioned at least one antenna to the first circuit path, so the at least one antenna of the second circuit path is "borrowed" to the first circuit path and the number of antennas of the first circuit path is increased. To take the first circuit path having N (an integer within a value range of 2 to 10) antennas as an example, for example, a scenario of N=4 is illustrated in FIG. 1; and after executing step 63, the number of antennas of the first circuit path becomes N+n, where n (an integer within a value range of 1-5) is the number of antennas "borrowed"; and for example, an SIM card 2 "borrowing" one antenna to an SIM card 1 is illustrated in FIG. 7, and at the moment, the number of antennas of the first circuit path changes from 4 to 5.

In this step, the processor may select either antenna as the transmitting antenna and the remaining antennas serve as the receiving antennas. In an example, the processor may obtain the reference signal received power of all antennas of the first circuit path, and then determine the antenna with the highest reference signal received power as the transmitting antenna and the other antennas as the receiving antennas. Considering that the antenna with the highest reference signal received power is least affected by a holding posture, a transmitting capability of the first circuit path may be ensured. Further, the other antennas serve as the receiving antennas, the number of receiving antennas is increased compared to a solution in the related art, a data receiving capability of the first circuit path may be enhanced, a data receiving capability of the antennas is ensued, and performance of the antennas is ensured. That is, in the example, by increasing the number of antennas of the first circuit path, different antennas may be configured to transmit data and receive data respectively, so that a capability of receiving and transmitting data by the antennas is ensured and performance of the antennas is ensured.

In one example, the working status of the SIM cards in the first circuit path and the second circuit path of the electronic device may be shifted to a status that two SIM cards are working, for example a dual SIM dual active (DSDA) status. The dual SIM dual active (DSDA) status refers to a status where the two SIM cards may be in a call simultaneously. For example, a user adjusts the configuration information of the SIM cards in a configuration interface of the electronic device, and changes the working status of the SIM cards. When the working status is the dual SIM dual active (DSDA) status, the processor may shift the at least one antenna (previously) shifted to the first circuit path back to the second circuit path, that is, "return" the "borrowed" antenna to the second circuit path. For example, FIG. 8 illustrates the SIM card 1 returning the "borrowed" antenna to the SIM card 2. At the moment, the number of antennas of the first circuit path changes from 5 to 4, so that the first circuit path and the second circuit path both use their original antennas, and a communication efficiency of the circuit paths is ensured.

Figure 9:
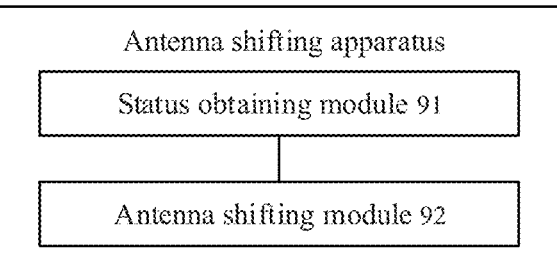
FIG. 9 is a block chart of an antenna shifting apparatus illustrated according to an example.

On the basis of an antenna shifting method provided by the example of the disclosure, an example of the disclosure further provides an antenna shifting apparatus, applied to an electronic device. The electronic device includes a first circuit path and a second circuit path; a first SIM card slot is arranged in the first circuit path and a second SIM card slot is arranged in the second circuit path; and the first SIM card slot and the second SIM card slot are configured to accommodate a SIM card respectively. Referring to FIG. 9, the antenna shifting apparatus includes:

a status obtaining module 91, configured to obtain a working status of the SIM cards in the first circuit path and the second circuit path, where the working status includes a status that only the SIM card in the first circuit path is working; and an antenna shifting module 92, configured to shift, in response to determining that the working status is the status that only the SIM card in the first circuit path is working, at least one antenna of the second circuit path to the first circuit path.

Optionally, the status obtaining module includes:

a service type obtaining sub-module, configured to obtain a service type currently executed by the electronic device; and a working status obtaining sub-module, configured to determine the working status of the SIM cards in the first circuit path and the second circuit path according to the service type.

Optionally, the status obtaining module includes:

a switch status obtaining sub-module, configured to obtain a switch status of a shift switch; and a working status obtaining sub-module, configured to determine the working status of the SIM cards in the first circuit path and the second circuit path according to the switch status.

Optionally, the status obtaining module includes:

a configuration information obtaining sub-module, configured to obtain configuration information of the SIM cards in the electronic device; and a working status obtaining sub-module, configured to determine the working status of the SIM cards in the first circuit path and the second circuit path according to the configuration information.

Optionally, the antenna shifting module includes:

a power obtaining sub-module, configured to obtain reference signal received power of each antenna in the second circuit path;

an antenna selecting sub-module, configured to select at least one antenna corresponding to the reference signal received power according to a sequence from high to low; and an antenna shifting sub-module, configured to shift the at least one antenna to the first circuit path.

Optionally, the apparatus further includes:

a received power obtaining module, configured to obtain reference signal received power of all antennas of the first circuit path; and a transceiving antenna determining module, configured to determine an antenna with the highest reference signal received power as a transmitting antenna and other antennas as receiving antennas.

Optionally, the apparatus further includes:

an antenna shifting module, configured to shift, in response to determining that the working status is a status that the two SIM cards are working, the at least one antenna shifted to the first circuit path back to the second circuit path.

It should be noted that the content of the apparatus example illustrated in the example of the disclosure matches that of the above method example, so reference may be made to the content of the above method example, which is no longer repeated here.

Figure 10:
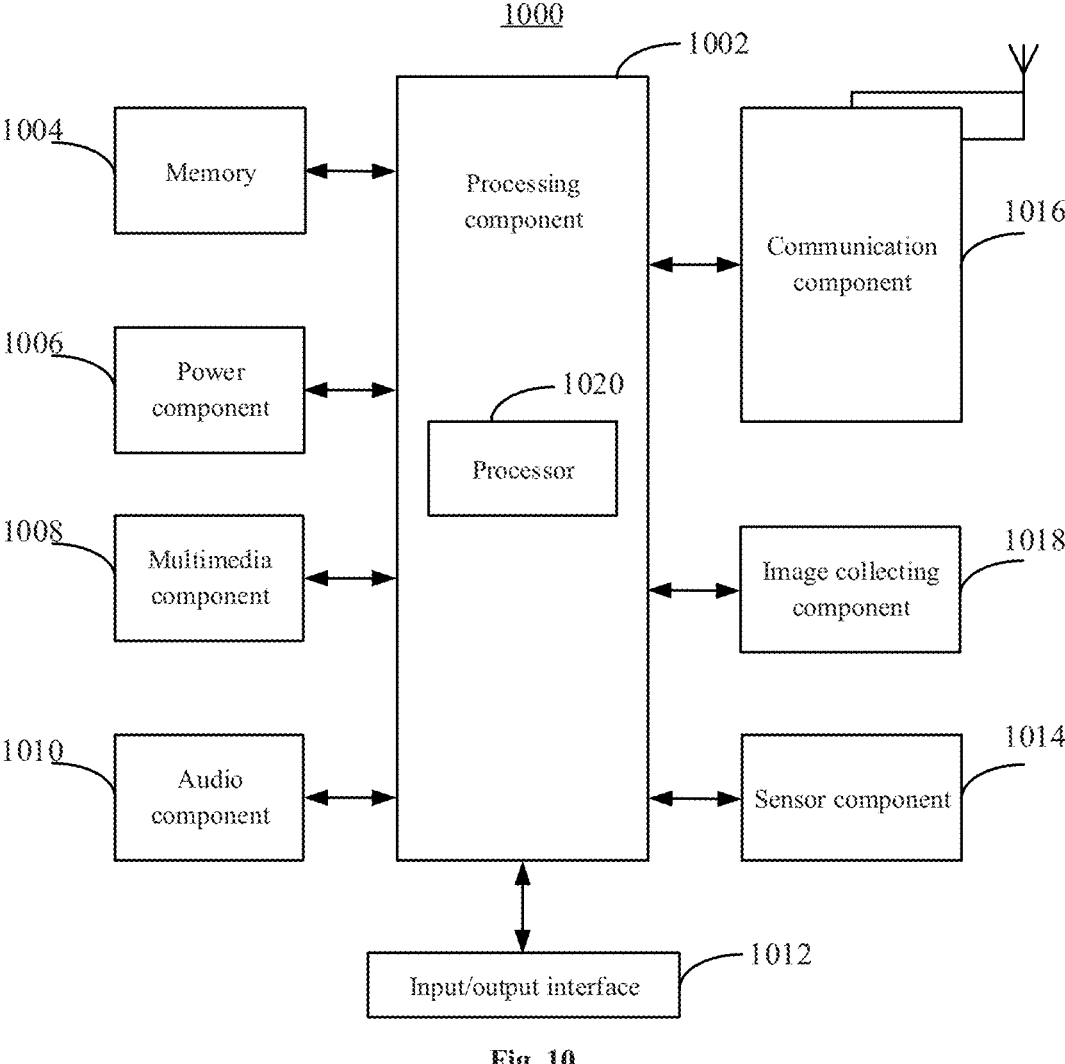
FIG. 10 is a block chart of an electronic device illustrated according to an example.

FIG. 10 is a block chart of an electronic device illustrated according to an example of the disclosure. For example, the electronic device 1000 may be a mobile phone, a computer, a digital broadcasting terminal, a tablet device, a medical device, a fitness device, a personal digital assistant, etc.

With reference to FIG. 10, the electronic device 1000 may include one or more of the following components: a processing component 1002, a memory 1004, a power component 1006, a multimedia component 1008, an audio component 1010, an input/output (I/O) interface 1012, a sensor component 1014, a communication component 1016, and an image collecting component 1018.

The processing component 1002 generally controls overall operations of the electronic device 1000, such as operations associated with display, telephone calls, data communication, camera operations, and recording operations. The processing component 1002 may include one or more processors 1020 to execute computer programs. In addition, the processing component 1002 may include one or more modules to facilitate interaction between the processing component 1002 and other components. For example, the processing component 1002 may include a multimedia module to facilitate interaction between the multimedia component 1008 and the processing component 1002.

The memory 1004 is configured to store various types of data to support operations on the electronic device 1000. Examples of these data include a computer program of any application program or method operating on the electronic device 1000, contact data, phone book data, messages, pictures, videos, etc. The memory 1004 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 1006 provides power to various components of the electronic device 1000. The power component 1006 may include a power management system, one or more power supplies, and other components associated with generation, management, and distribution of the power for the electronic device 1000. The power component 1006 may include a power chip, and a controller may communicate with the power chip, thus controlling the power chip to turn on or disconnect a first switching device, so that a battery supplies power to a motherboard circuit or does not supply power.

The multimedia component 1008 includes a screen that provides an output interface between the electronic device 1000 and a target object. In some examples, the screen may include a liquid crystal display (LCD) and a touch panel (TP). If the screen includes the touch panel, the screen may be implemented as a touch screen to receive input information from the target object. The touch panel includes one or more touch sensors to sense touch, swipe, and gestures on the touch panel. The touch sensor may not only sense a boundary of a touch or swipe action, but also detect a duration and pressure related to touch or swipe operation.

The audio component 1010 is configured to output and/or input audio file information. For instance, the audio component 1010 includes a microphone (MIC). When the electronic device 1000 is in the operation mode, such as a call mode, a recording mode, and a voice recognition mode, the microphone is configured to receive external audio file information. The received audio file information may be further stored in the memory 1004 or sent via the communication component 1016. In some examples, the audio component 1010 further includes a speaker for outputting the audio file information.

The I/O interface 1012 provides an interface between the processing component 1002 and a peripheral interface module. The above peripheral interface module may be a keyboard, a click wheel, buttons, etc.

The sensor component 1014 includes one or more sensors to provide the electronic device 1000 with various aspects of status assessment. For example, the sensor component 1014 may detect an on/off status of the electronic device 1000 and relative positioning of a component. For example, the component is a display and a keypad of the electronic device 1000. The sensor component 1014 may also detect a position change of the electronic device 1000 or a component, presence or absence of contact between the target object and the electronic device 1000, orientation or acceleration/deceleration of the electronic device 1000, and a temperature change of the electronic device 1000. In this example, the sensor component 1014 may include a magnetic sensor, a gyroscope and a magnetic field sensor, and may further include an inertial sensor, an image sensor, etc. The magnetic field sensor includes at least one of the following: a Hall sensor, a thin-film magneto resistive sensor, or a magnetic liquid acceleration sensor.

The communication component 1016 is configured to facilitate wired or wireless communication between the electronic device 1000 and other devices. The electronic device 1000 may access a wireless network based on a communication standard, such as WiFi, 2G or 3G, 4G, a 5G or a combination of them. In an example, the communication component 1016 receives broadcast information or broadcast related information from an external broadcast management system via a broadcast channel. In an example, the communication component 1016 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology and other technologies. In an example, the communication component 1016 includes two ID cards, the two ID cards may be in a single standby, dual SIM dual standby or dual SIM dual active status, and the processor may combine the above working status to shift antennas in circuit paths. For a specific shifting process, reference may be made to the method example shown in FIG. 2, which will not be repeated here.

In an example, the electronic device 1000 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements.

In an example, an example of the disclosure further provides an electronic device, including:

a first circuit path and a second circuit path. A first SIM card slot is arranged in the first circuit path and a second SIM card slot is arranged in the second circuit path; the first SIM card slot and the second SIM card slot are configured to accommodate a SIM card respectively; and the electronic device further includes a shifting module, a memory and a processor.

The shifting module is electrically connected with the first circuit path, the second circuit path and the processor respectively; and the processor is electrically connected with the memory.

The memory is configured to store a computer program executable by the processor.

The processor is configured to execute the computer program in the memory so as to implement the method according to FIG. 2.

In an example, an example of the disclosure further provides a non-transitory computer-readable storage medium. A processor, when executing an executable computer program in the storage medium, can implement the abovementioned method.

In an example, a chip is further provided. The chip includes a processor and an interface, configured to read a computer program through the interface to implement the above method. The chip may be a conventional CPU (central processing unit) chip, a GPU (graphics processing unit) chip, etc., or an acceleration chip dedicated to an artificial intelligence technology, such as AI (artificial intelligence) accelerators.

After considering the specification and practicing the disclosure disclosed here, those of skill in the art will easily think of other implementation solutions of the disclosure. The disclosure is intended to cover any variations, purposes, or adaptive changes of the disclosure. These variations, purposes, or adaptive changes follow the general principles of the disclosure and include common knowledge or conventional technical means in the technical field that are not disclosed in the disclosure. The specification and the examples are to be regarded as exemplary only, and the true scope and spirit of the disclosure are pointed out by the appended claims.

It should be understood that the disclosure is not limited to the precise structure that has been described above and shown in the accompanying drawings, and various modifications and changes can be made without departing from its scope. The scope of the disclosure is only limited by the appended claims.

According to a first aspect of an example of the disclosure, an antenna shifting method is provided and performed by an electronic device. The electronic device includes a first circuit path and a second circuit path; a first SIM card slot is arranged in the first circuit path and a second SIM card slot is arranged in the second circuit path; the first SIM card slot and the second SIM card slot are configured to accommodate a SIM card respectively; and the method includes:

obtaining a working status of the SIM cards in the first circuit path and the second circuit path, where the working status includes a status that only the SIM card in the first circuit path is working; and shifting, in response to determining that the working status is the status that only the SIM card in the first circuit path is working, at least one antenna of the second circuit path to the first circuit path.

Optionally, obtaining the working status of the SIM cards in the first circuit path and the second circuit path includes:

obtaining a service type currently executed by the electronic device; and determining the working status of the SIM cards in the first circuit path and the second circuit path according to the service type.

Optionally, obtaining the working status of the SIM cards in the first circuit path and the second circuit path includes:

obtaining a switch status of a shift switch; and determining the working status of the SIM cards in the first circuit path and the second circuit path according to the switch status.

Optionally, obtaining the working status of the SIM cards in the first circuit path and the second circuit path includes:

obtaining configuration information of the SIM cards in the electronic device; and determining the working status of the SIM cards in the first circuit path and the second circuit path according to the configuration information.

Optionally, shifting the at least one antenna of the second circuit path to the first circuit path includes:

obtaining reference signal received power of each antenna in the second circuit path;

selecting at least one antenna corresponding to the reference signal received power according to a sequence from high to low; and shifting the at least one antenna to the first circuit path.

Optionally, the method further includes:

obtaining reference signal received power of all antennas of the first circuit path; and determining an antenna with the highest reference signal received power as a transmitting antenna and other antennas as receiving antennas.

Optionally, the method further includes:

shifting, in response to determining that the working status is a status that the two SIM cards are working, the at least one antenna shifted to the first circuit path back to the second circuit path.

According to a second aspect of an example of the disclosure, an antenna shifting apparatus is provided and applied to an electronic device. The electronic device includes a first circuit path and a second circuit path; a first SIM card slot is arranged in the first circuit path and a second SIM card slot is arranged in the second circuit path; the first SIM card slot and the second SIM card slot are configured to accommodate a SIM card respectively; and the apparatus includes:

a status obtaining module, configured to obtain a working status of the SIM cards in the first circuit path and the second circuit path, where the working status includes a status that only the SIM card in the first circuit path is working; and an antenna shifting module, configured to shift, in response to determining that the working status is the status that only the SIM card in the first circuit path is working, at least one antenna of the second circuit path to the first circuit path.

Optionally, the status obtaining module includes:

a service type obtaining sub-module, configured to obtain a service type currently executed by the electronic device; and a working status obtaining sub-module, configured to determine the working status of the SIM cards in the first circuit path and the second circuit path according to the service type.

Optionally, the status obtaining module includes:

a switch status obtaining sub-module, configured to obtain a switch status of a shift switch; and a working status obtaining sub-module, configured to determine the working status of the SIM cards in the first circuit path and the second circuit path according to the switch status.

Optionally, the status obtaining module includes:

a configuration information obtaining sub-module, configured to obtain configuration information of the SIM cards in the electronic device; and a working status obtaining sub-module, configured to determine the working status of the SIM cards in the first circuit path and the second circuit path according to the configuration information.

Optionally, the antenna shifting module includes:

a power obtaining sub-module, configured to obtain reference signal received power of each antenna in the second circuit path;

an antenna selecting sub-module, configured to select at least one antenna corresponding to the reference signal received power according to a sequence from high to low; and an antenna shifting sub-module, configured to shift the at least one antenna to the first circuit path.

Optionally, the apparatus further includes:

a received power obtaining module, configured to obtain reference signal received power of all antennas of the first circuit path; and a transceiving antenna determining module, configured to determine an antenna with the highest reference signal received power as a transmitting antenna and other antennas as receiving antennas.

Optionally, the apparatus further includes:

an antenna shifting module, configured to shift, in response to determining that the working status is a status that the two SIM cards are working, the at least one antenna shifted to the first circuit path back to the second circuit path.

According to a third aspect of an example of the disclosure, an electronic device is provided. The electronic device includes a first circuit path and a second circuit path; a first SIM card slot is arranged in the first circuit path and a second SIM card slot is arranged in the second circuit path; the first SIM card slot and the second SIM card slot are configured to accommodate a SIM card respectively; and the electronic device further includes a shifting module, a memory and a processor;

the shifting module is electrically connected with the first circuit path, the second circuit path and the processor respectively; and the processor is electrically connected with the memory;

the memory is configured to store a computer program executable by the processor; and the processor is configured to:

obtain a working status of the SIM cards in the first circuit path and the second circuit path; and shift, in response to determining that the working status is the status that only the SIM card in the first circuit path is working, at least one antenna of the second circuit path to the first circuit path.

Optionally, the processor is further configured to:

obtain a service type currently executed by the electronic device; and determine the working status of the SIM cards in the first circuit path and the second circuit path according to the service type.

Optionally, the processor is further configured to:

obtain a switch status of a shift switch; and determine the working status of the SIM cards in the first circuit path and the second circuit path according to the switch status.

Optionally, the processor is further configured to:

obtain configuration information of the SIM cards in the electronic device; and determine the working status of the SIM cards in the first circuit path and the second circuit path according to the configuration information.

According to a fourth aspect of an example of the disclosure, a non-transitory computer-readable storage medium is provided, on which computer program are stored that, when executed by a processor, cause the processor to:

obtain a working status of the SIM cards in the first circuit path and the second circuit path; and shift, in response to determining that the working status is the status that only the SIM card in the first circuit path is working, at least one antenna of the second circuit path to the first circuit path.

The technical solution provided by the example of the disclosure may include the following beneficial effects:

the solution provided by the example of the disclosure may obtain the working status of the SIM cards in the first circuit path and the second circuit path; the working status includes the status that only the SIM card in the first circuit path is working; and in response to determining that the working status is the status that only the SIM card in the first circuit path is working, at least one antenna of the second circuit path is shifted to the first circuit path. In this way, in the example of the disclosure, by increasing the number of antennas of the first circuit path, different antennas may be configured to transmit data and receive data respectively, so that a capability of receiving and transmitting the data of the antennas is ensured and performance of the antennas is ensured.

The invention claimed is:

1. An antenna shifting method, performed by an electronic device, wherein the electronic device comprises a first circuit path and a second circuit path; a first subscriber identity module (SIM) card slot is arranged in the first circuit path and a second SIM card slot is arranged in the second circuit path; the first SIM card slot and the second SIM card slot are each configured to accommodate an SIM card respectively; wherein the first circuit path comprises N antennas, the second circuit path comprises N antennas, and a value range of N is 2 to 10; and the antenna shifting method comprises:

obtaining a working status of the SIM cards in the first circuit path and the second circuit path; and shifting, in response to determining that the working status is a status that only the SIM card in the first circuit path is working, at least one antenna of the second circuit path to the first circuit path;

wherein the method further comprises:

obtaining reference signal received power of all antennas of the first circuit path; and determining an antenna with highest reference signal received power as a transmitting antenna and other antennas as receiving antennas.

2. The antenna shifting method according to claim 1, wherein obtaining the working status of the SIM cards in the first circuit path and the second circuit path comprises:

obtaining a service type currently executed by the electronic device; and determining the working status of the SIM cards in the first circuit path and the second circuit path according to the service type.

3. The antenna shifting method according to claim 2, further comprising:

shifting, in response to determining that the working status is a status that the two SIM cards are working, the at least one antenna shifted to the first circuit path back to the second circuit path.

4. The antenna shifting method according to claim 1, wherein obtaining the working status of the SIM cards in the first circuit path and the second circuit path comprises:

obtaining a switch status of a shift switch; and determining the working status of the SIM cards in the first circuit path and the second circuit path according to the switch status.

5. The antenna shifting method according to claim 4, further comprising:

shifting, in response to determining that the working status is a status that the two SIM cards are working, the at least one antenna shifted to the first circuit path back to the second circuit path.

6. The antenna shifting method according to claim 1, wherein obtaining the working status of the SIM cards in the first circuit path and the second circuit path comprises:

obtaining configuration information of the SIM cards in the electronic device; and determining the working status of the SIM cards in the first circuit path and the second circuit path according to the configuration information.

7. The antenna shifting method according to claim 6, further comprising:

shifting, in response to determining that the working status is a status that the two SIM cards are working, the at least one antenna shifted to the first circuit path back to the second circuit path.

8. The antenna shifting method according to claim 1, wherein shifting the at least one antenna of the second circuit path to the first circuit path comprises:

obtaining reference signal received power of each antenna in the second circuit path;

selecting at least one antenna corresponding to the reference signal received power according to a sequence from high to low; and shifting the at least one antenna to the first circuit path.

9. The antenna shifting method according to claim 8, further comprising:

shifting, in response to determining that the working status is a status that the two SIM cards are working, the at least one antenna shifted to the first circuit path back to the second circuit path.

10. The antenna shifting method according to claim 1, further comprising:

shifting, in response to determining that the working status is a status that the two SIM cards are working, the at least one antenna shifted to the first circuit path back to the second circuit path.

11. An electronic device, comprising: a first circuit path and a second circuit path, wherein a first subscriber identity module (SIM) card slot is arranged in the first circuit path, a second SIM card slot is arranged in the second circuit path, the first SIM card slot and the second SIM card slot are configured to accommodate an SIM card respectively, the first circuit path comprises N antennas, the second circuit path comprises N antennas, and a value range of N is 2 to 10; and a shifting module, a memory and a processor, wherein the shifting module is electrically connected with the first circuit path, the second circuit path and the processor respectively; and the processor is electrically connected with the memory;

the memory is configured to store a computer program executable by the processor; and the processor is configured to:

obtain a working status of the SIM cards in the first circuit path and the second circuit path; and shift, in response to determining that the working status is
a status that only the SIM card in the first circuit path
is working, at least one antenna of the second circuit
path to the first circuit path;
wherein the processor is further configured to:
obtain reference signal received power of all antennas of
the first circuit path; and
determine an antenna with highest reference signal
received power as a transmitting antenna and other
antennas as receiving antennas.
12. The electronic device according to claim 11, wherein
the processor is further configured to:
obtain a service type currently executed by the electronic
device; and
determine the working status of the SIM cards in the first
circuit path and the second circuit path according to the
service type.
13. The electronic device according to claim 11, wherein
the processor is further configured to:
obtain a switch status of a shift switch; and
determine the working status of the SIM cards in the first
circuit path and the second circuit path according to the
switch status.
14. The electronic device according to claim 11, wherein
the processor is further configured to:

obtain configuration information of the SIM cards in the
electronic device; and
determine the working status of the SIM cards in the first
circuit path and the second circuit path according to the
configuration information.
15. A non-transitory computer-readable storage medium,
on which computer program instructions are stored that,
when executed by a processor, cause the processor to:
obtain a working status of subscriber identity module
(SIM) cards in a first circuit path and a second circuit
path; and
shift, in response to determining that the working status is
a status that only the SIM card in the first circuit path
is working, at least one antenna of the second circuit
path to the first circuit path;
wherein the first circuit path comprises N antennas, the
second circuit path comprises N antennas, and a value
range of N is 2 to 10;
wherein the computer program instructions further cause
the processor to:
obtain reference signal received power of all antennas of
the first circuit path; and
determine an antenna with highest reference signal
received power as a transmitting antenna and other
antennas as receiving antennas.

* * * * *